United States Patent Office 3,328,433
Patented June 27, 1967

3,328,433
STEROIDS OF THE Δ¹⁴-PREGNANE SERIES
George Cooley, Bernard Ellis, and Vladimir Petrow, London, England, assignors to The British Drug Houses Limited
No Drawing. Filed Nov. 18, 1964, Ser. No. 413,398
Claims priority, application Great Britain, Nov. 22, 1963, 46,186/63
9 Claims. (Cl. 260—397.4)

This invention is for improvements in or relating to organic compounds, and has particular reference to new steroids of the 6-methyl-Δ¹⁴-pregnane series.

It is an object of the present invention to provide new steroids of the 6-methyl-Δ¹⁴-pregnane series having the formula

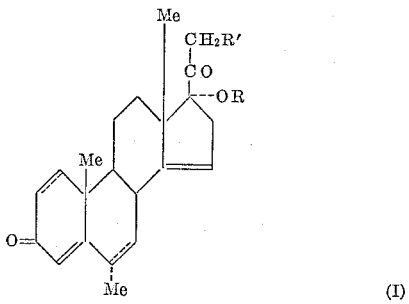

where R is an acyl group containing up to six carbon atoms, and R' is a hydrogen atom, a fluorine atom, or an acyloxy group containing up to six carbon atoms. In addition, a double bond may or may not extend from $C_6$ to $C_7$ and/or from $C_1$ to $C_2$.

The compounds of the present invention possess that group of biological properties usually associated with progestins. Thus they may possess in varying degrees progestational and ovulation-inhibiting properties which may render them of value in the treatment of various pharmacological disorders. The compounds of the present invention may exert a beneficial effect upon aged skin, for example when administered regularly by inuction, improving its appearance. They may correspondingly be used in the dermatological field. The compounds of the present invention also possesses claudogenic properties and may be used, admixed with oestrogen if desired, for control of fertility in the veterinary fields.

The compounds of the present invention may be administered in pharmacological and veterinary packs for example as tablets or by injection. For dermatological use they may be used in the form of ointments or unctions.

It is a further object of the present invention to provide pharmaceutical preparations of the new 6-methyl-Δ¹⁴-pregnane compounds in admixture with one or more solid or liquid pharmaceutically acceptable inert carriers.

This invention provides the following novel compounds:

17α-acetoxy-6-formyl-3-methoxypregna-3,5,14-trien-20-one
17α-acetoxy-6α-methylpregna-4,14-diene-3,20-dione
17α-acetoxy-6-methylpregna-4,6,14-triene-3,20-dione
17α-acetoxy-6-hydroxymethyl-3-methoxypregna-3,5,14-trien-20-one
17α-acetoxy-6-methylenepregna-4,14-diene-3,20-dione
17α,21-diacetoxy-6-formyl-3-methoxypregna-3,5,14-trien-20-one
17α,21-diacetoxy-6α-methylpregna-4,14-diene-3,20-dione
17α-21-diacetoxy-6-methylpregna-4,6,14-triene-3,20-dione
17α,21-diacetoxy-6-hydroxymethyl-3-methoxypregna-3,5,14-triene-20-one
17α-21-diacetoxy-6-methylenepregna-4,14-diene-3,20-dione
17α-acetoxy-6α-methylpregna-1,4,14-triene-3,20-dione
17α-acetoxy-6-methylpregna-1,4,6,14-tetraene-3,20-dione According to the present invention there is provided a process for the preparation of 6-methyl-Δ¹⁴-pregnane compounds having the Formula I above, which process comprises treating a 3-enol ether having the formula

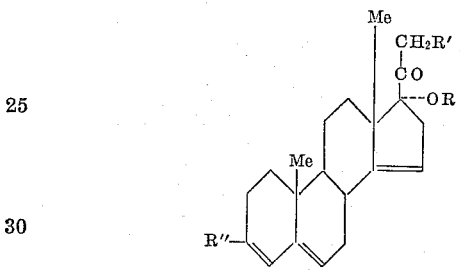

(where R and R' have the same meaning as above, and R" is O-alkyl, O-hydroxyalkyl, O-cycloalkyl or O-alkaryl) with a formylating agent which does not modify the conjugated system to yield the 6-formyl derivative

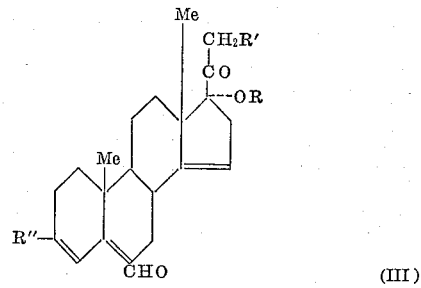

(where R, R' and R" have the same meaning as above), treating the 6-formyl derivative with an acidified metallic catalyst in the presence of a hydrogen donor in an organic solvent to yield the corresponding 6α-methyl-3-oxo-Δ⁴,¹⁴-pregnane derivative (I, where R and R' have the same meaning as above) and if desired dehydrogenating with chloranil to yield the 6-methyl-3-oxo-Δ⁴,⁶,¹⁴-pregnane compound (I, where R and R' have the same meaning as above).

The 6α-methyl-3-oxo-Δ⁴,¹⁴-pregnane derivative (I) or the 6-methyl-3-oxo-Δ⁴,⁶,¹⁴-pregnane compound (I) may be converted into the corresponding 1-dehydro derivatives by methods known in the art, for example by reaction with dichlorodicyano-1,4-benzoquinone or by microbiological methods.

According to a modification of the process, the 6-formyl derivative (III) may be reduced to yield the corresponding 6-hydroxymethyl derivative (IV)

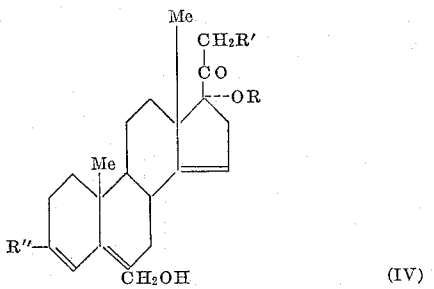

(IV)

(where R, R' and R'' have the same meaning as above), and the 6-hydroxymethyl derivative is treated with an acidic reagent to give the 6-methylene-3-oxo-$\Delta^4$-intermediate

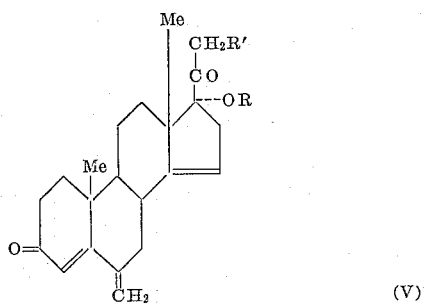

(V)

(where R and R' have the same meaning as above), which is then isomerised to the 6-methyl-3-oxo-$\Delta^{4,6,14}$-pregnane compound (I, where R and R' have the same meaning as above). Additionally, the 6-methylene intermediate (V) may be reduced catalytically to the corresponding 3-oxo-$\Delta^{4,14}$-6-methyl pregnane derivative using, for example, a catalyst comprising palladium on strontium carbonate.

The $\Delta^1$-double bond may then be introduced as indicated above.

The formylating agent which does not modify the conjugating system in order to yield the 6-formyl derivative (III) is the Vilsmeier reagent (see for example Houben-Weyl, Methoden der Organische Chemie, 4th ed., 1954, vol. 7 (I), page 29 et seq., Bosshard and Zollinger, Helv, Chim. Acta, 1959, 42, 1659).

As known to those skilled in the art, the condensation of an unsaturated system with the Vilsmeier reagent is generally carried out under essentially anhydrous conditions when an iminium intermediate is obtained, which intermediate passes into the required formyl derivative on aqueous hydrolysis. The Vilsmeier reagent and the reaction conditions are fully described in U.S. Patent No. 3,084,159, issued on Apr. 2, 1963.

The preferred acidified metallic catalyst employed for the conversion of the 6-formyl-3-enol ether (III) into the 6α-methyl-3-oxo-$\Delta^{4,14}$-pregnane derivative (I) is palladium/charcoal, cyclohexene is the preferred hydrogen donor, and ethanol is the preferred organic solvent. From 0.2 to 1 part palladium/charcoal and 1 to 5 parts cyclohexene may be added to 1 part of the 6-formyl compound (III) in 10 to 20 vols of ethanol, and the mixture may be heated under reflux for 1 to 3 hours. Thereafter the product may be isolated and purified by conventional methods. The reaction conditions appertaining to this type of reduction are fully described in our copending application No. 245,685, filed Jan. 2, 1962, now U.S. Patent No. 3,166,551.

Dehydrogenation of the 6α-methyl-3-oxo-$\Delta^{4,14}$-pregnane derivative (I) to give the 6-methyl-3-oxo-$\Delta^{4,6,14}$-pregnane compound (I) may be achieved by treating the 6α-methyl-3-oxo-$\Delta^{4,14}$-pregnane (I) derivative with an excess (of one equivalent) of chloranil in a boiling alkanol, preferably sec. butanol, containing a trace of p-nitrophenol as catalyst. When reaction is complete (circa 8 hours), the product may be isolated and purified by conventional methods.

$\Delta^1$-unsaturation may be introduced by the procedure of our U.S. Patent No. 3,023,206 issued Feb. 27, 1962.

Reduction of the 6-formyl 3-enol ether (III) to give the corresponding 6-hydroxymethyl 3-enol ether (IV) may be achieved by the use of a wide variety of reducing agents, including washed Raney nickel, platinum/charcoal in the presence of a sodium acetate buffer and certain organometallic hydrides. In a preferred method, the 6-formyl 3-enol ether (III) in anhydrous tetrahydrofuran may be treated with lithium borohydride. After 5 to 15 minutes at room temperature the mixture may be treated with water and the product (IV) isolated and purified. This and other methods of reduction are described fully in our U.S. Patent No. 3,095,411, issued June 25, 1963.

Conversion of the 6-hydroxymethyl derivatives (IV) into the corresponding 6-methylene-3-oxo-$\Delta^4$ intermediates (V) may be effected by reagents which are known by prior art to regenerate 3-oxo-$\Delta^4$-steroids from the corresponding 3-enol ethers. Such reagents are acidic in character and include procedures, by way of example, such as solution of the steroid in acetic acid followed by dilution with water, and treatment with catalytic quantities of acids, including toluene-p-sulphonic acid, in such solvents as dioxan.

Isomerisation of the 6-methylene-3-oxo-$\Delta^4$-intermediate (V) to give the 6-methyl-3-oxo-$\Delta^{4,6,14}$-pregnane (I) may be effected by contacting the compound (V) in a solvent with an activated metallic catalyst. The preferred method of achieving this transformation involves heating the 6-methylene steroid (V) with a catalytic quantity of 5% palladium/charcoal in ethanol containing some sodium acetate. Isomerisation is generally complete in from 12 to 60 hours. This and other variants of the method are fully described in our copending application Ser. No. 225,906, filed Sept. 24, 1962, now U.S. Patent No. 3,117,966.

Following is a description by way of example of methods of carrying the invention into effect.

The starting material employed in Example 1 may be prepared as follows:

17α-acetoxypregna-4,14-diene-3,20-dione (15.3 g.) (Bohlmann, Hinz and Diedrich, Berichte 1316 (1963)) in dry dioxan (350 l.) was treated with trimethylorthoformate (14 ml.), methanol (1.4 ml.) and a 5% solution of sulphuric acid in dioxan (10 ml.). After 30 minutes at room temperature, pyridine (10.5 ml.) was added and the mixture diluted with water to give 17α-acetoxy-3-methoxypregna-3,5,14-trien-20-one. Purified from methanol containing pyridine, it formed flakes, M.P. 209–214° C., $[\alpha]_D^{27}$ −225° (c., 0.43 in chloroform containing 0.2% pyridine), $\lambda_{max.}^{EtOH}$ 239 m$\mu$ ($\epsilon$ 18,400), $\nu_{max.}^{CCl_4}$ 1740, 1722, 1655, and 1630 cm.$^{-1}$ The starting material employed in Example 3 may be prepared as follows:

21-acetoxy-17α-hydroxypregna-4,14-dien-3,20-dione (Bloom, Agnello and Laubach, Experientia, 1956, 12, 27) (4.65 g.) suspended in redistilled acetic acid (100 ml.) and redistilled acetic anhydride (19 ml.) under nitrogen, was cooled in ice, and toluene p-sulphonic acid (3.5 g.) was added. The mixture was allowed to stand for 16 hours under nitrogen at room temperature and then poured into iced water. The solid obtained was collected by filtration and purified from methanol to give 17α,21-diacetoxypregna-4,14-diene-3,20-dione, plates, M.P. 192–194° C., $[\alpha]_D^{26}$ −0.5° (c., 1.015 in chloroform), $\lambda_{max.}^{EtOH}$ 238 m$\mu$ ($\epsilon$ 17,700), $\nu_{max.}^{CCl_4}$ 1755, 1741, 1680 and 1618 cm.$^{-1}$ The foregoing diacetate (1.8 g.) in dry dioxan (40 ml.) was treated with trimethylorthoformate (2 ml.), methanol (0.2 ml.) and sulphuric acid (1 drop) and the mixture left at room temperature for 35 minutes. Dilution with water gave a solid which was purified from methanol containing a trace of pyridine, to give 17α,21-diacetoxy-3-methoxypregna-3,5,14-trien-20-one as needles, M.P. 139–145° C., $[α]_D^{26}$ −168° (c., 1.195 in chloroform), $λ_{max.}^{EtOH}$ 240 mμ (ε 21,290), $ν_{max.}^{CCl_4}$ 1755, 1738, 1656 and 1629 cm.$^{-1}$

EXAMPLE 1

*17α-acetoxy-6-methylpregna-4,6,14-triene-3,20-dione*

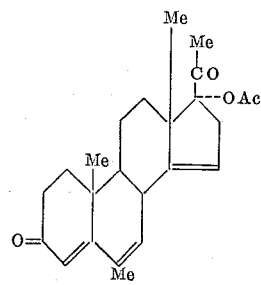

A solution of phosgene (10% w./v. in ethylene dichloride) (20 ml.) was added during 15 minutes to a stirred solution of dimethylformamide (2.5 ml.) in ethylene dichloride (10 ml.) cooled to 0° C. After a further 10 minutes, a solution of 17α-acetoxy-3-methoxypregna-3,5,14-trien-20-one (3.05 g.) in ethylene dichloride (17.5 ml.) containing a drop of pyridine was added and the mixture stirred and allowed to attain room temperature during 2 hours. It was then poured into a solution of sodium acetate (4.0 g.) in water (6.0 ml.) and methanol (25 ml.). The mixture was stirred a further 10 minutes and then extracted with ether. The ethereal solution was washed with dilute sodium hydrogen carbonate solution, with water to neutrality, dried and the solvents removed under reduced pressure. The residual gum was crystallised from acetone and methanol to give 17α-acetoxy-6-formyl-3-methoxypregna-3,5,14-trien-20-one, rods, M.P. 199–200° C., $[α]_D^{26}$ −183° (c., 0.328 in chloroform), $λ_{max.}^{EtOH}$ 218.5 mμ (ε 10,900) and 320 mμ (ε 14,500), $ν_{max.}^{CCl_4}$ 1739, 1720, 1660 and 1619 cm.$^{-1}$ A mixture of the foregoing compound and 5% palladium/charcoal (1.2 g.) in ethanol (160 ml.) and cyclohexene (8 ml.) was heated under reflux for 2 hours. It was then filtered and the filtrate diluted with water to crystallisation point. The product was dissolved in hot methanol (40 ml.), concentrated hydrochloric acid (0.1 ml.) was added, and the mixture diluted with water to give 17α - acetoxy-6α-methylpregna-4,14-diene-3,20-dione. The filtrate was extracted with ether, the ethereal layer washed neutral, dried and evaporated in vacuo. The residue was chromatographed on alumina. Fractions eluted with benzene-ether (4:1) gave a further quantity of 17α - acetoxy - 6α-methylpregna-4,14-diene-3,20-dione. Purification from acetone/hexane gave needles, M.P. 184–187° C., $[α]_D$ −34.5° (c., 0.84 in CHCl$_3$), $λ_{max.}^{EtOH}$ 238 mμ (ε 15,500)

A solution of the foregoing compound (1.25 g.), recrystallised chloranil (1.25 g.), and p-nitrophenol (110 mg.) in redistilled sec.-butanol (18.75 ml.) was heated under reflux for 7¾ hours. After standing overnight, the mixture was diluted with ether, the ethereal solution washed portionwise with 5% aqueous potassium hydroxide (300 ml.), then with water, dried, and the solvents removed under reduced pressure. The residue was crystallised from methanol to give 17α-acetoxy-6-methylpregna-4,6,14-triene-3,20-dione as slender rods, M.P. 214–215° C., $[α]_D$ −25° (c., 1.03 in chloroform), $λ_{max.}^{EtOH}$ 286 mμ (ε 21,200), $ν_{max.}^{CCl_4}$ 1741, 1724, 1669, 1632 cm.$^{-1}$

EXAMPLE 2

*17α-acetoxy-6-methylpregna-4,6,14-triene-3,20-dione*

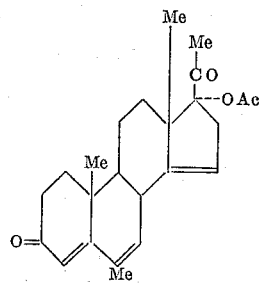

A solution of 17α-acetoxy-6-formyl-3-methoxypregna-3,5,14-trien-20-one (prepared as described in Example 1) (0.64 g.) in dry tetrahydrofuran (5 ml.) was mechanically stirred and treated with lithium borohydride (100 mg.). After being stirred a further 10 minutes, the mixture was poured into iced water. The product was isolated with ether and purified from methanol containing a trace of pyridine to give 17α-acetoxy-6-hydroxymethyl-3-methoxypregna-3,5,14-trien-20-one as flat needles, M.P. 122–123° C., $[α]_D^{26}$ −213° (c., 0.234 in chloroform containing 0.2% pyridine), $λ_{max.}^{EtOH}$ 249 mμ (ε 17,500), $ν_{max.}^{CCl_4}$ 3605, 2945, 1743, 1725, 1650, 1622 cm.$^{-1}$ A solution of the foregoing compound (460 mg.) in acetic acid (3 ml.) was warmed and gradually diluted with water to crystallization point. Purification of the crystals from ethanol gave 17α-acetoxy-6-methylenepregna-4,14-diene-3,20-dione, rectangular prisms, M.P. 166–167° C., $[α]_D^{26}$ +122.4° (c., 0.69 in chloroform), $λ_{max.}^{EtOH}$ 260 mμ (ε 10,250), $ν_{max.}^{CCl_4}$ 1745, 1726, 1681 and 907 cm.$^{-1}$ The foregoing compound (300 mg.) in boiling ethanol (8 ml.) was treated with 5% palladium/charcoal (50 mg.) and sodium acetate (150 mg.), and the stirred mixture heated under reflux for 20 hours. The mixture was filtered, and the filtrate diluted with water to give 17α-acetoxy-6-methylpregna-4,6,14-triene-3,20-dione, identical in all respects with the sample prepared in Example 1.

EXAMPLE 3

*17α,21-diacetoxy-6-methylpregna-4,6,14-triene-3,20-dione*

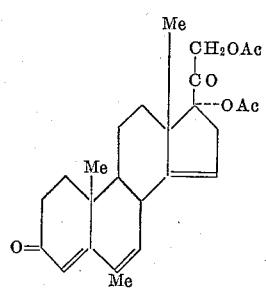

A solution of phosgene (10% w./v. in ethylene dichloride) (20 ml.) was added dropwise during 15 minutes, to a stirred solution of dimethylformamide (1.25 ml.) and ethylene dichloride (5 ml.) cooled to 0° C. The mixture was stirred a further 15 minutes, and a solution of 17α,21- diacetoxy-3-methoxypregna-3,5,14-trien-20-one (1.34 g.) in ethylene dichloride (6.25 ml.) containing a drop of pyridine was then added. The stirred mixture was allowed to attain room temperature during 2 hours, and then poured into a solution of sodium acetate (2.0 g.) in water (3.0 ml.) and methanol (12.5 ml.). After being stirred a further 10 minutes, the mixture was extracted with ether and the ethereal layer separated. It was washed with a solution of sodium hydrogen carbonate, then with water to neutrality and dried. The solvents were removed under reduced pressure and the residual gum treated twice with acetone which was evaporated to remove traces of ethylene dichloride. Crystallisation from methanol gave 17α,21-diacetoxy-6-formyl-3-methoxypregna-3,5,14-trien-20-one as lustrous plates, M.P. 176–176.5° C., $[\alpha]_D^{24}$ −153° (c., 0.69 in chloroform)

$\lambda_{max.}^{EtOH}$ 219 mμ ($\epsilon$ 11,500) and 321 mμ ($\epsilon$ 15,340), $\nu_{max.}^{CCl_4}$ 1754, 1741, 1664 and 1620 cm.$^{-1}$ The foregoing compound (1.0 g.) in boiling ethanol (40 ml.) was treated with cyclohexene (2 ml.) and 5% palladium/charcoal (300 mg.) and the mixture was stirred and heated under reflux for 2 hours. The mixture was filtered, and the filtrate evaporated under reduced pressure. Crystallisation of the residue from ethanol gave 17α,21-diacetoxy-6α-methylpregna-4,14-diene-3,20-dione as dense plates, M.P. 188–189° C., $[\alpha]_D^{26}$ −11.4° (c., 1.24 in chloroform), $\lambda_{max.}^{EtOH}$ 239 mμ ($\epsilon$ 15,220), $\nu_{max.}^{CCl_4}$ 1755, 1740, 1680 and 1610 cm.$^{-1}$ A mixture of the foregoing compound (400 mg.), recrystallised chloranil (400 mg.), and p-nitrophenol (40 mg.) in redistilled sec.-butanol (6.25 ml.) was heated under reflux for 8 hours. Next morning the mixture was diluted with ether (100 ml.) and washed portionwise with a total of 100 ml. of 5% aqueous potassium hydroxide. The ethereal layer was washed neutral with water, dried, and the solvents removed. The residue was crystallised from methanol to give 17α,21-diacetoxy-6-methylpregna-4,6,14-triene-3,20-dione, M.P. 187–191° C., $\lambda_{max.}^{EtOH}$ 283.5–284 mμ ($\epsilon$ 16,690), $\nu_{max.}^{CCl_4}$ 1754, 1743, 1667 and 1630 cm.$^{-1}$

EXAMPLE 4

*17α,21-diacetoxy-6-methylpregna-4,6,14-triene-3,20-dione*

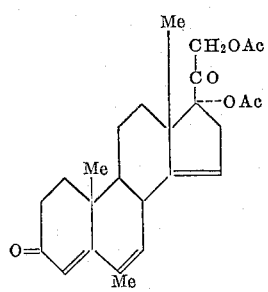

17α,21-diacetoxy-6-formyl-3-methoxypregna-3,5,14-trien-20-one (0.83 g.) in dry tetrahydrofuran (8 ml.) was stirred and treated with lithium borohydride (125 mg.). After being stirred a further 10 minutes, the mixture was poured into water and the gummy product isolated with ether. The ethereal extract was washed neutral with salt solution, dried, and evaporated to dryness. The residue of 17α,21-diacetoxy-6-hydroxymethyl-3-methoxypregna-3,5,14-triene-20-one was dissolved in warm acetic acid (4 ml.) and the solution diluted with water. The crystalline product was collected and purified from methanol to give 17a,21-diacetoxy-6-methylenepregna-4,14-diene-3,20-dione as plates, M.P. 205–208° C., $[\alpha]_D^{25}$+143° (c., 0.80 in chloroform), $\lambda_{max.}^{EtOH}$ 260 mμ ($\epsilon$ 7,140), $\nu_{max.}^{CCl_4}$ 1755, 1741, 1677 and 1628 cm.$^{-1}$ The foregoing compound (300 mg.) in boiling ethanol (8 ml.) was treated with 5% palladium/charcoal (50 mg.) and sodium acetate (150 mg.), and the stirred mixture heated under reflux for 20 hours. The mixture was filtered, the filtrate evaporated, and the residue was crystallised from methanol to give 17α,21-diacetoxy-6-methylpregna-4,6,14-triene-3,20-dione, identical in all respects with the sample prepared as described in Example 3.

EXAMPLE 5

*O/W emulsified ointment containing 1 percent of 17α-acetoxy-6-methylpregna-4,6,14-triene-3,20-dione*

|  | G. |
|---|---|
| 17α-acetoxy-6-methylpregna-4,6,14-triene-3,20-dione | 1.0 |
| Cetostearyl alcohol | 11.7 |
| Sodium lauryl sulphate | 1.3 |
| Benzyl alcohol | 1.5 |
| Polyoxyethylene sorbitan monooleate | 0.1 |
| Soft white paraffin | 10.5 |
| Glycerin | 6.0 |
| Purified water, sufficient to make 100.0 g. | |

The medicament is reduced to a very fine powder either by passing through a fluid energy mill or by mechanical or hand grinding.

The cetostearyl alcohol and soft white paraffin are melted together at 70° C. and the hot mixture strained into a solution of the glycerin and sodium lauryl sulphate in 65 ml. of the purified water, also at 70° C. After addition of the benzyl alcohol, the mixture is allowed to cool, with continuous stirring, until the ointment base begins to set.

A dispersion of the finely divided medicament is made by wetting it with the polyoxyethylene sorbitan monooleate and the remainder of the water, the dispersion being blended with the pre-formed base. Blending is continued for a further 15 minutes and the ointment then allowed to set-up for 1 hour.

EXAMPLE 6

*17α-acetoxy-6α-methylpregna-1,4,14-triene-3,20-dione*

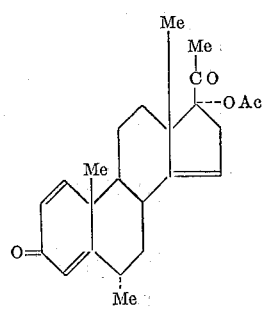

A mixture of 17α-acetoxy-6α-methylpregna-4,14-diene-3,20-dione (2 g.) (prepared as described in Example 1) and 2,3-dichloro-5,6-dicyano-1,4-benzoquinone (2 g.) in benzene (28 ml.) was heated for 19 hours under reflux. The mixture was filtered, and the precipitate washed with benzene. The combined filtrate and washings was diluted with more benzene (200 ml.), and the whole was washed with 4% aqueous sodium hydroxide (200 ml.). The benzene layer was then washed with water, dried, treated, with decolorising charcoal, and the solvent removed under reduced pressure. Purification of the residue from acetone-hexane gave 17α-acetoxy-6α-methylpregna-1,4,14-triene-3,20-dione, as flat needles, M.P. 191–194° C., $[\alpha]_D^{26}$ —90° (c., 0.35 in chloroform), $\lambda_{max.}^{EtOH}$ 242 m$\mu$ ($\epsilon$ 14,300)

EXAMPLE 7

*17α-acetoxy-6-methylpregna-1,4,6,14-tetraene-3,20-dione*

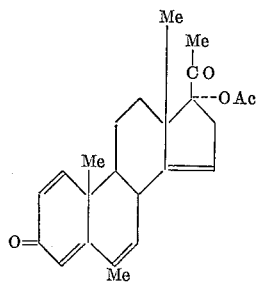

A mixture of 17α - acetoxy - 6 - methylpregna - 4,6,14-triene-3,20-dione (0.5 g.) (prepared as described in Example 1) and 2,3-dichloro-5,6-dicyano-1,4-benzoquinone (0.5 g.) in benzene (7 ml.) was heated under reflux for 19 hours. The mixture was filtered, and the precipitate washed with benzene. The combined filtrate and washings (about 50 ml.) was washed with 4% aqueous sodium hydroxide, then with water, dried, and the solvent was removed under reduced pressure. Crystallisation of the residue from acetone-hexane gave 17α - acetoxy-6-methylpregna - 1,4,6,14 - tetraene - 3,20 - dione, M.P. as needles, M.P. 201–203° C., $[\alpha]_D^{26}$—72° (c., 0.5 in CHCl$_3$), $\lambda_{max.}^{EtOH}$ 296 m$\mu$ ($\epsilon$ 12,900), 252 m$\mu$ ($\epsilon$ 8,560), 226 m$\mu$ ($\epsilon$ 11,400)

The compound had claudogenic and in particular antinidation activity.

We claim:
1. 6-methyl-$\Delta^{14}$-pregnane compounds having the formula

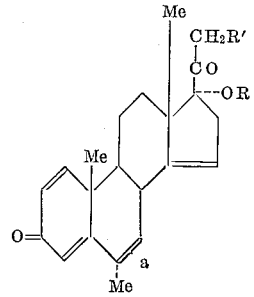

where R is an acyl group containing up to six carbon atoms, R' is selected from the group consisting of a hydrogen atom and an acyloxy group containing up to six carbon atoms and $a$ is selected from the group consisting of single and double bonds.

2. 17α - acetoxy - 6 - formyl-3-methoxypregna-3,5,14-trien-20-one.

3. 17α - acetoxy - 6-hydroxymethyl-3-methoxypregna-3,5,14-trien-20-one.

4. 17α - acetoxy - 6 - methylenepregna - 4,14, - diene-3,20-dione.

5. 17α,21 - diacetoxy - 6 - formyl - 3 - methoxypregna-3,5,14-trien-20-one.

6. 17α,21 - diacetoxy - 6 - hydroxymethyl - 3-methoxypregna-3,5,14-trien-20-one.

7. 17α,21 - diacetoxy - 6 - methylenepregna - 4,14-diene-3,20-dione.

8. 17α - acetoxy - 6α - methylpregna - 1,4,14, - triene-3,20-dione.

9. 17α - acetoxy - 6 - methylpregna - 1,4,6,14-tetraene-3,20-dione.

References Cited
UNITED STATES PATENTS 3,095,411   6/1963   Kirk et al. _____ 260—239.55

OTHER REFERENCES

Bohlmann et al.: "Chem. Berichte," May 1963, pages 1316 to 1327 relied on.

LEWIS GOTTS, *Primary Examiner.*

ELBERT L. ROBERTS, *Examiner.*